US008558734B1

(12) United States Patent
Piesinger

(10) Patent No.: US 8,558,734 B1
(45) Date of Patent: Oct. 15, 2013

(54) THREE DIMENSIONAL RADAR ANTENNA METHOD AND APPARATUS

(76) Inventor: Gregory Hubert Piesinger, Cave Creek, AZ (US)

( * ) Notice: Subject to any disclaimer, the term of this patent is extended or adjusted under 35 U.S.C. 154(b) by 259 days.

(21) Appl. No.: 12/804,173

(22) Filed: Jul. 15, 2010

Related U.S. Application Data

(60) Provisional application No. 61/271,546, filed on Jul. 22, 2009.

(51) Int. Cl.
*G01S 13/08* (2006.01)
*G01S 13/00* (2006.01)
*H01Q 19/06* (2006.01)
*H01Q 19/10* (2006.01)
*H01Q 13/00* (2006.01)
*H01Q 21/08* (2006.01)
*H01Q 19/12* (2006.01)
*H01Q 21/00* (2006.01)
*H01Q 15/14* (2006.01)
*H01Q 15/20* (2006.01)

(52) U.S. Cl.
USPC ........... 342/123; 342/147; 342/157; 342/158; 343/753; 343/755; 343/781 R; 343/824; 343/840; 343/844; 343/912; 343/915; 343/916

(58) Field of Classification Search
USPC .......... 342/123, 147–158, 373; 343/753–755, 343/700 MS, 761, 781 R, 781 P, 781 CA, 343/824–827, 834–840, 844, 912–916
See application file for complete search history.

(56) References Cited

U.S. PATENT DOCUMENTS

| | | | | |
|---|---|---|---|---|
| 3,016,531 A * | 1/1962 | Tomiyasu et al. | ............. | 342/198 |
| 3,070,795 A * | 12/1962 | Chambers | ...................... | 342/147 |
| 3,080,523 A * | 3/1963 | Miller | ............................. | 343/731 |
| 3,170,158 A * | 2/1965 | Rotman | ........................ | 342/376 |
| 3,182,318 A * | 5/1965 | Brown | .......................... | 342/146 |
| 3,214,755 A * | 10/1965 | Blass et al. | ..................... | 342/123 |
| 3,267,472 A * | 8/1966 | Fink | ................................ | 342/368 |
| 3,274,593 A * | 9/1966 | Varela et al. | .................. | 342/147 |
| 3,295,128 A * | 12/1966 | Canaday et al. | .............. | 342/129 |
| 3,438,035 A * | 4/1969 | Fling et al. | ..................... | 342/375 |
| 3,448,450 A * | 6/1969 | Alfandari et al. | .............. | 342/157 |
| 3,775,769 A * | 11/1973 | Heeren et al. | ................. | 342/376 |
| 3,790,938 A * | 2/1974 | Anderson et al. | ............. | 342/162 |
| 3,815,134 A * | 6/1974 | Jones | ............................. | 342/159 |
| 3,864,679 A * | 2/1975 | Hannan et al. | ................ | 342/405 |
| 3,881,178 A * | 4/1975 | Hannan | .......................... | 343/779 |
| 3,916,415 A * | 10/1975 | Howrey | ......................... | 343/754 |
| 3,938,149 A * | 2/1976 | Grantham | ....................... | 342/94 |
| 3,971,020 A * | 7/1976 | Howard | ......................... | 342/129 |
| 4,101,902 A * | 7/1978 | Trigon | ........................... | 342/374 |
| 4,129,872 A * | 12/1978 | Toman | ........................... | 343/768 |
| 4,156,243 A * | 5/1979 | Yorinks et al. | ................. | 343/779 |

(Continued)

*Primary Examiner* — Jack W Keith
*Assistant Examiner* — Peter Bythrow

(57) ABSTRACT

A ground based avian radar receive antenna is implemented using a vertically oriented offset parabolic cylindrical antenna. The desired azimuth beamwidth is determined by the width of the parabolic cylinder reflector surface and the desired elevation beamwidth by the height of the parabolic cylinder reflector surface. A vertical array of antenna elements is mounted along the vertical focal line to provide electronic scanning in elevation. Low sidelobe levels are obtained using tapered antenna element illumination. Low cost modular construction with high reflector accuracy is obtained by attaching a thin metal reflector to thin ribs machined or stamped in the shape of the parabolic cylinder reflector surface. The antenna is enclosed in a radome and mechanically rotated 360 degrees in azimuth.

19 Claims, 7 Drawing Sheets

(56) References Cited

U.S. PATENT DOCUMENTS

| | | | | |
|---|---|---|---|---|
| 4,158,840 A * | | 6/1979 | Schwab | 342/52 |
| 4,342,997 A * | | 8/1982 | Evans | 342/156 |
| 4,353,073 A * | | 10/1982 | Brunner et al. | 343/779 |
| 4,408,205 A * | | 10/1983 | Hockham | 342/157 |
| 4,544,925 A * | | 10/1985 | Drabowitch et al. | 342/16 |
| 4,631,545 A * | | 12/1986 | Dragone | 343/779 |
| 4,649,389 A * | | 3/1987 | Taylor et al. | 342/123 |
| 4,675,681 A * | | 6/1987 | Kinsey | 342/372 |
| 4,689,632 A * | | 8/1987 | Graham | 343/781 P |
| 4,724,439 A * | | 2/1988 | Wiley et al. | 342/351 |
| 4,996,532 A * | | 2/1991 | Kirimoto et al. | 342/81 |
| 5,008,678 A * | | 4/1991 | Herman | 342/158 |
| 5,016,018 A * | | 5/1991 | Chang et al. | 342/351 |
| 5,059,966 A * | | 10/1991 | Fujisaka et al. | 342/25 A |
| 5,072,226 A * | | 12/1991 | Chang et al. | 342/351 |
| 5,202,700 A * | | 4/1993 | Miller | 343/840 |
| 5,389,941 A * | | 2/1995 | Yu | 343/797 |
| 5,448,243 A * | | 9/1995 | Bethke et al. | 342/59 |
| 5,546,096 A * | | 8/1996 | Wada | 343/771 |
| 5,557,282 A * | | 9/1996 | Mertens | 342/123 |
| 5,579,010 A * | | 11/1996 | Iihoshi et al. | 342/70 |
| 5,598,173 A * | | 1/1997 | Lo Forti et al. | 343/781 R |
| 5,686,923 A * | | 11/1997 | Schaller | 342/352 |
| 5,754,139 A * | | 5/1998 | Turcotte et al. | 342/373 |
| 5,812,096 A * | | 9/1998 | Tilford | 343/781 R |
| 5,815,113 A * | | 9/1998 | Lo et al. | 342/351 |
| 5,856,804 A * | | 1/1999 | Turcotte et al. | 342/371 |
| 5,859,609 A * | | 1/1999 | Sheen et al. | 342/179 |
| 6,052,024 A * | | 4/2000 | Lo et al. | 330/53 |
| 6,078,298 A * | | 6/2000 | Planning et al. | 343/840 |
| 6,087,999 A * | | 7/2000 | Muhlhauser et al. | 343/753 |
| 6,091,363 A * | | 7/2000 | Komatsu et al. | 343/700 MS |
| 6,107,897 A * | | 8/2000 | Muhlhauser et al. | 333/135 |
| 6,160,520 A * | | 12/2000 | Muhlhauser et al. | 343/755 |
| 6,172,650 B1 * | | 1/2001 | Ogawa et al. | 343/836 |
| 6,181,293 B1 * | | 1/2001 | Muhlhauser et al. | 343/840 |
| 6,353,421 B1 * | | 3/2002 | Lalezari et al. | 343/915 |
| 6,411,255 B2 * | | 6/2002 | Roederer | 342/371 |
| 6,507,313 B1 * | | 1/2003 | Rougas | 342/368 |
| 6,819,285 B1 * | | 11/2004 | Stockman et al. | 342/123 |
| 6,888,515 B2 * | | 5/2005 | Bekey | 343/912 |
| 7,006,053 B2 * | | 2/2006 | Zigler et al. | 343/878 |
| 7,019,703 B2 * | | 3/2006 | Webb et al. | 343/761 |
| 7,194,236 B2 * | | 3/2007 | Lovberg et al. | 455/25 |
| 7,315,279 B1 * | | 1/2008 | Milbourne | 342/373 |
| 7,378,629 B2 * | | 5/2008 | Goutoule et al. | 250/203.6 |
| 7,385,549 B2 * | | 6/2008 | Lovberg et al. | 342/22 |
| 7,415,244 B2 * | | 8/2008 | Kolinko et al. | 455/25 |
| 7,570,221 B2 * | | 8/2009 | May et al. | 343/753 |
| 7,834,807 B2 * | | 11/2010 | Chang | 342/370 |
| 7,864,103 B2 * | | 1/2011 | Weber et al. | 342/123 |
| 8,098,612 B2 * | | 1/2012 | Chang | 370/316 |
| 8,395,546 B2 * | | 3/2013 | Chang | 342/373 |
| 2003/0038745 A1 * | | 2/2003 | Lalezari et al. | 342/368 |
| 2004/0189545 A1 * | | 9/2004 | Bekey | 343/912 |
| 2004/0217908 A1 * | | 11/2004 | Zigler et al. | 343/757 |
| 2005/0057428 A1 * | | 3/2005 | Fujita | 343/882 |
| 2005/0140563 A1 * | | 6/2005 | Eom et al. | 343/840 |
| 2005/0237265 A1 * | | 10/2005 | Durham et al. | 343/909 |
| 2005/0248495 A1 * | | 11/2005 | Webb et al. | 343/757 |
| 2005/0259006 A1 * | | 11/2005 | Kim et al. | 342/377 |
| 2006/0017605 A1 * | | 1/2006 | Lovberg et al. | 342/22 |
| 2006/0148525 A1 * | | 7/2006 | Moon et al. | 455/562.1 |
| 2007/0194977 A1 * | | 8/2007 | Goutoule et al. | 342/25 R |
| 2008/0266171 A1 * | | 10/2008 | Weber et al. | 342/123 |
| 2008/0291083 A1 * | | 11/2008 | Chang | 342/354 |
| 2011/0032143 A1 * | | 2/2011 | Sun et al. | 342/354 |

* cited by examiner

THREE DIMENSIONAL RADAR ANTENNA METHOD AND APPARATUS

RELATED INVENTION

The present invention claims priority under 35 U.S.C. §119 (e) to: "3D Radar Antenna Method and Apparatus" Provisional U.S. Patent Application Ser. No. 61/271,546, filed 22 Jul. 2009 which is incorporated by reference herein.

TECHNICAL FIELD OF THE INVENTION

The present invention relates to the field of three-dimensional (3D) radar. More specifically, the present invention relates to the field of 3D avian radar for detecting, determining height, and tracking birds.

BACKGROUND OF THE INVENTION

Aviation experts say bird-plane collisions happen daily. Nearly 200 people have been killed or injured since 1990 in accidents involving aircraft and wildlife. It is estimated that bird strikes cost military and commercial aviation over $2 billion each year due to damage and other costs.

Airports take a variety of measures to reduce bird populations near major airports. In a few cases, ground based avian radars are used to detect flying birds near aircraft approach and departure paths. Currently, most ground based avian radars consist of modified marine radars using a long narrow horizontal antenna that is rotated in the horizontal plane to provide 360 degree azimuth coverage. These antennas provide narrow azimuth beamwidths and wide elevation beamwidths. Almost no target height information is provided due to the wide elevation beamwidths.

Accordingly, it is the object of the present invention to disclose methods and apparatus which provide a new and improved low cost 3D avian radar with target altitude determination capability.

SUMMARY OF THE INVENTION

Previously, an avian radar was described in patent application Ser. No. 12/661,595 "Three Dimensional Radar Method and Apparatus", filed 18 Mar. 2010 which is incorporated herein by reference. application Ser. No. 12/661/595 describes a 3D ground based radar whose receiving antenna consists of a vertical array of horizontal fixed scan narrow azimuth beamwidth slotted waveguide antenna elements. These horizontal elements are electronically combined to provide a narrow azimuth and elevation beamwidth antenna that can be mechanically scanned in azimuth and electronically scanned in elevation. The present invention describes an improved receiving antenna method and apparatus.

Briefly, to achieve the desired object of the present invention, a vertically oriented offset parabolic cylindrical receiving antenna is implemented. Using an array of antenna elements along its vertical offset continuous focal line allows a modular high performance electronically elevation scanned antenna to be built at low cost.

The desired azimuth beamwidth is controlled by the width of the parabolic cylinder and the desired elevation beamwidth by the height of the parabolic cylinder. A ribbed structure covered with a thin metal reflector is used to achieve the reflector surface accuracy required to obtain very low sidelobe performance. The antenna can be built in short modular vertical segments and stacked vertically to provide different elevation beamwidths.

Other objects and advantages of the present invention will become obvious as the preferred embodiments are described and discussed below.

DETAILED DESCRIPTION OF THE PREFERRED EMBODIMENTS

The goal of the present invention is to provide a low cost high gain receiving antenna with very low sidelobes that can be scanned mechanically in azimuth and scanned electronically in elevation.

Figure 1:
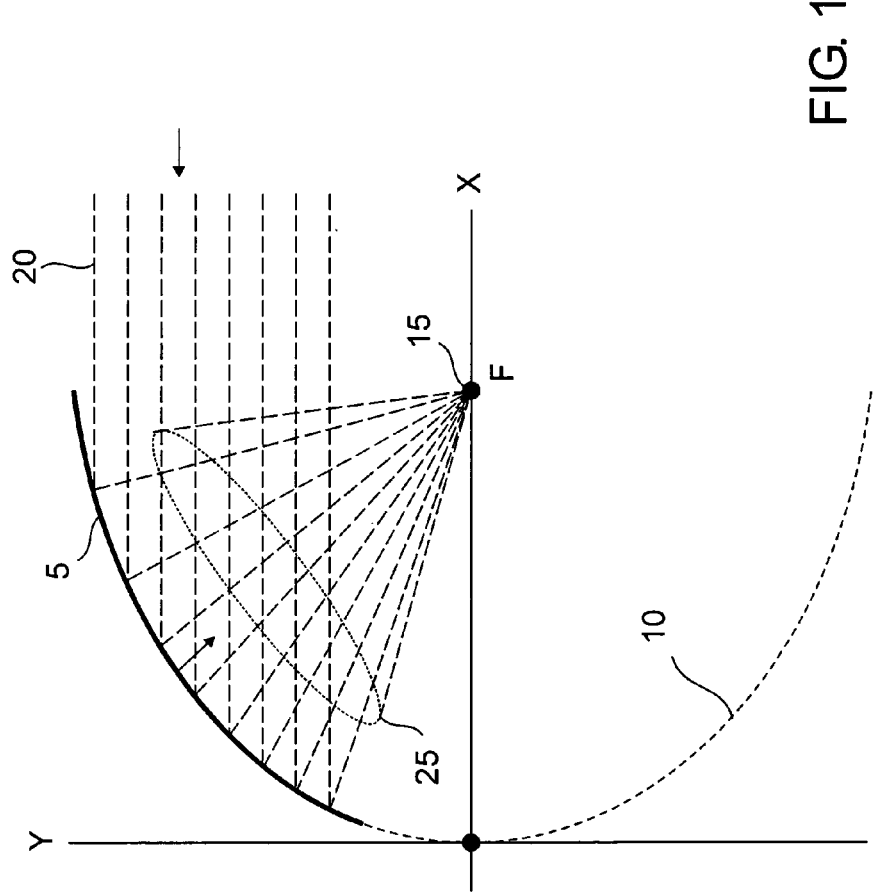
FIG. 1 illustrates the horizontal cross section of a vertically oriented offset parabolic cylinder antenna with vertical focal line 15.

A horizontal cross section of a vertically oriented offset parabolic cylinder antenna with vertical focal line 15 is illustrated in FIG. 1. A parabolic curve is formed in the x, y plane and extended in the z plane normal to the drawing to create a parabolic cylinder. Parabolic cylinder reflector surface 10 is eliminated leaving parabolic cylinder reflector surface 5. Incoming waves 20 are focused onto focal line 15 and collected by an array of antenna elements along focal line 15 using azimuth illumination pattern 25. Removing parabolic cylinder reflector surface 10 forms an offset parabolic cylinder antenna in which antenna elements do not obstruct incoming waves 20.

Figure 2:
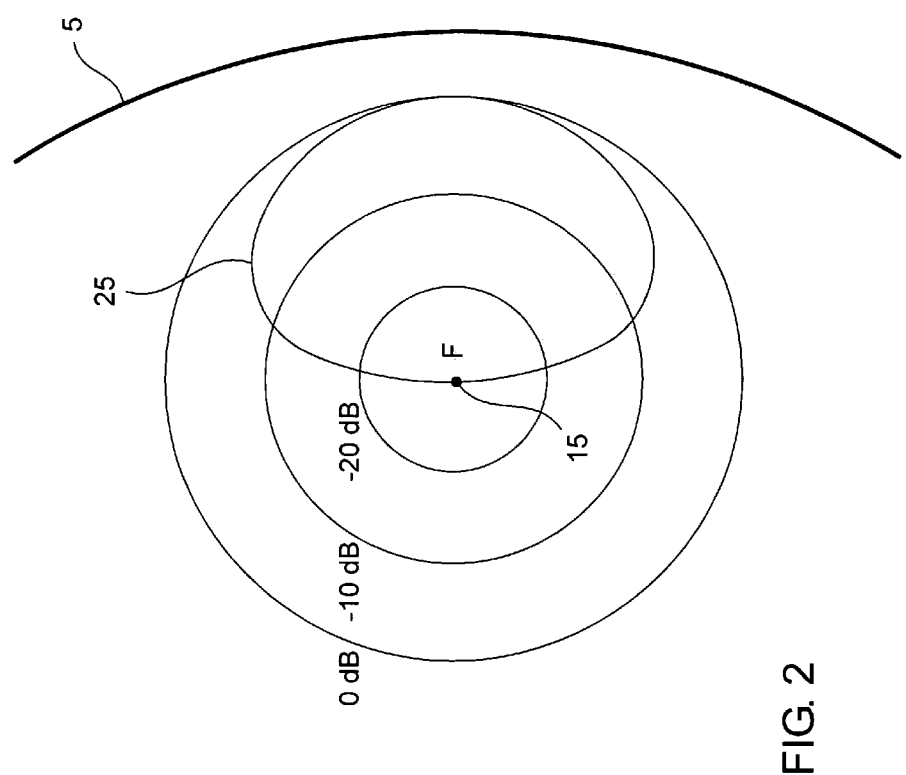
FIG. 2 illustrates an azimuth tapered antenna illumination pattern 25 illuminating parabolic cylinder reflector surface 5 of the vertically oriented offset parabolic cylinder antenna.

As is well known by those skilled in the art, the gain of an offset parabolic cylinder antenna is governed by its aperture area. Its efficiency and sidelobe performance are governed by antenna element illumination pattern 25 and by the accuracy of parabolic cylinder reflector surface 5. To obtain maximum efficiency, parabolic cylinder reflector surface 5 must be uniformly illuminated over its surface with no spillover energy beyond its edge. However, such uniform illumination produces only −13 dB sidelobes. To produce low antenna azimuth sidelobe levels, antenna element illumination pattern 25 must be tapered as illustrated in FIG. 2. Tapers in which edge illumination is on the order of −10 dB below center illumination are typically implemented as a compromise between efficiency and sidelobe level.

Figure 3:
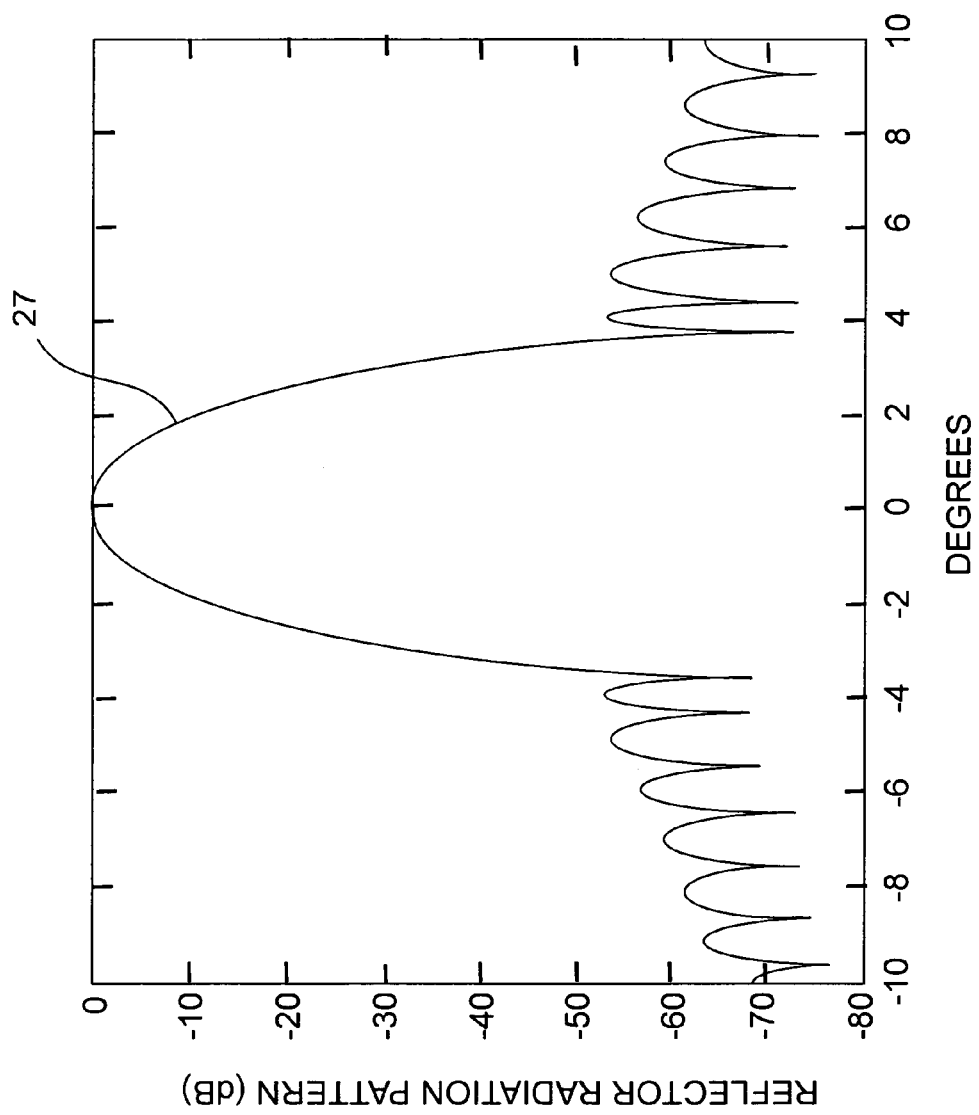
FIG. 3 illustrates a parabolic cylinder antenna pattern with sidelobe levels below −50 dB.

Parabolic cylinder antenna sidelobe levels below −50 dB, as illustrated in FIG. 3, are possible using the correct illumination pattern, parabolic surface accuracy, and antenna element position. There is always a tradeoff between antenna efficiency and sidelobe level. Since the antenna in the present invention is receive only, low sidelobes are more important than antenna efficiency. Therefore, optimizing antenna element illumination pattern 25 for low sidelobes is most important. Low sidelobes minimize the radar signal levels reflected from targets and clutter at azimuth angles outside the main azimuth beamwidth 27.

Figure 4:
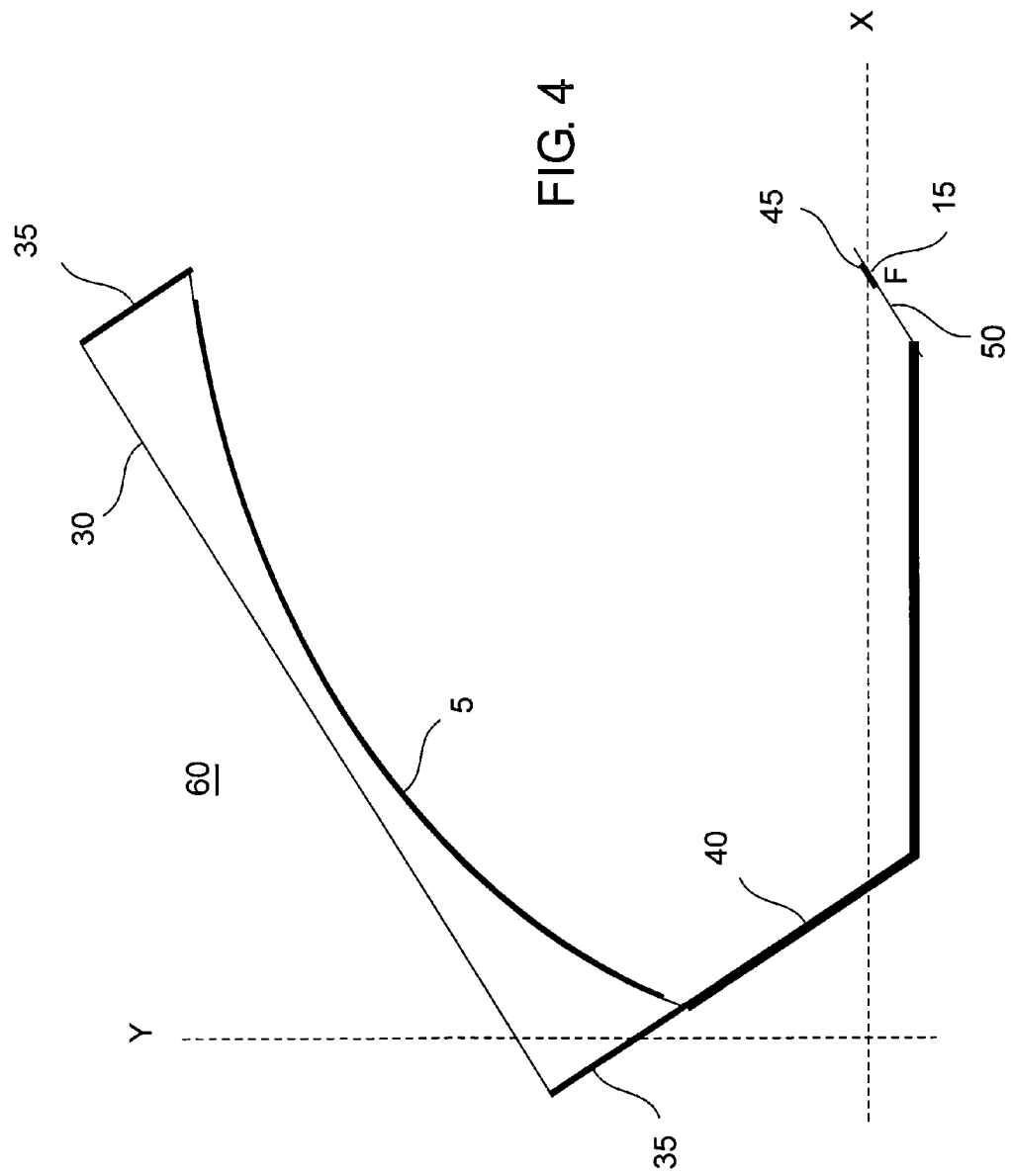
FIG. 4 is an overhead view of the offset parabolic cylinder antenna construction illustrating its horizontal cross section.

Very high parabolic cylinder reflector surface 5 and focal line 15 accuracy of offset parabolic cylinder antenna 60 can be provided at low cost using the structure illustrated in FIG. 4. FIG. 4 is an overhead view of the offset parabolic cylinder antenna 60 construction illustrating its horizontal cross section. A series of thin ribs 30, in which the parabolic curve can be machined or stamped to great accuracy, are stacked vertically to form a support for parabolic cylinder reflector surface 5 which can be tack welded (or fastened in any other way) to ribs 30. Thin rib supports 35 hold ribs 30 in precise position with respect to each other. For narrow offset parabolic cylinder antenna 60 widths, only a single thin rib support 35 is required on each end. For wide widths, additional thin rib supports 35 can be placed along the straight rear side of thin ribs 30. Focal line supports 40 hold thin ribs 30, parabolic cylinder reflector surface 5, and thin rib supports 35 in precise position along focal line 15. Printed circuit board (PCB) 50, containing antenna elements 45 positioned along focal line 15, are attached to focal line supports 40.

For the relatively narrowband radar signals contemplated for this avian radar, antenna elements 45 can be implemented at low cost using narrowband microwave patch antennas printed directly on PCB 50. Antennas with horizontal, vertical, or circular polarization can be implemented. However, horizontal polarization is most appropriate for avian targets because birds are wider in their horizontal dimension than in their vertical dimension thus maximizing their radar reflectivity using horizontal polarization. However, any appropriate antenna elements 45 can be implemented that meets the required sidelobe level and cost goals.

Figure 5:
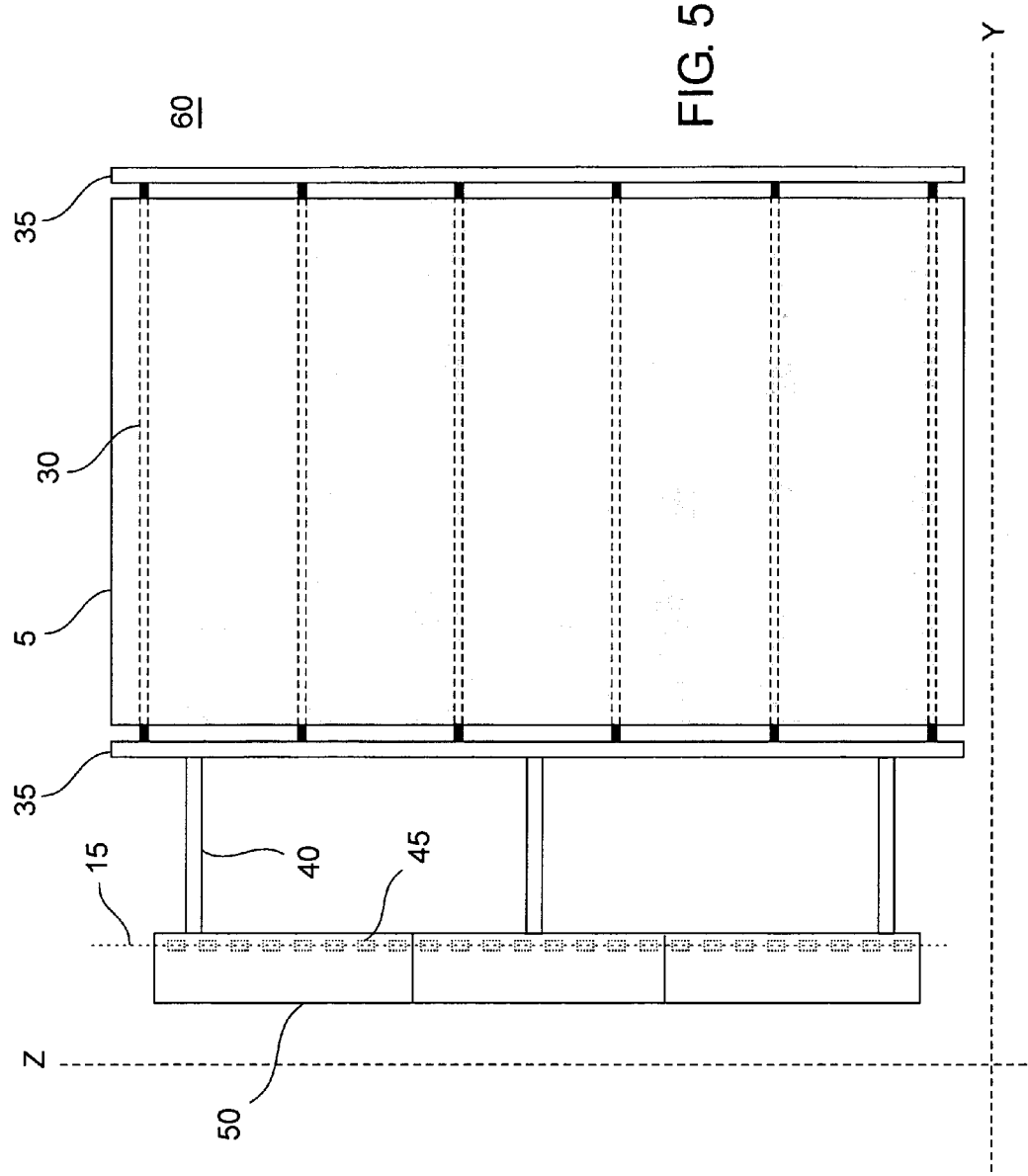
FIG. 5 is a frontal view of the offset parabolic cylinder antenna construction.

A frontal view of offset parabolic cylinder antenna 60 is illustrated in FIG. 5. Multiple antenna elements 45 are positioned along focal line 15 and separated from each other on the order of a half wavelength. Antenna elements 45 are grouped into sets of 8, 16, or any other convenient number and mounted on PCBs 50. Doing so provides a modular structure in which varying numbers of antenna elements 45 can be implemented. Conversely, the entire offset parabolic cylinder antenna 60 can be constructed as multiple short modular vertical sections which are stacked vertically to form the completed antenna assembly. Doing so allows narrower elevation beamwidths to be conveniently implemented simply by stacking more vertical sections. As is well known by those skilled in the art, narrower elevation beamwidths require larger elevation apertures.

Figure 6:
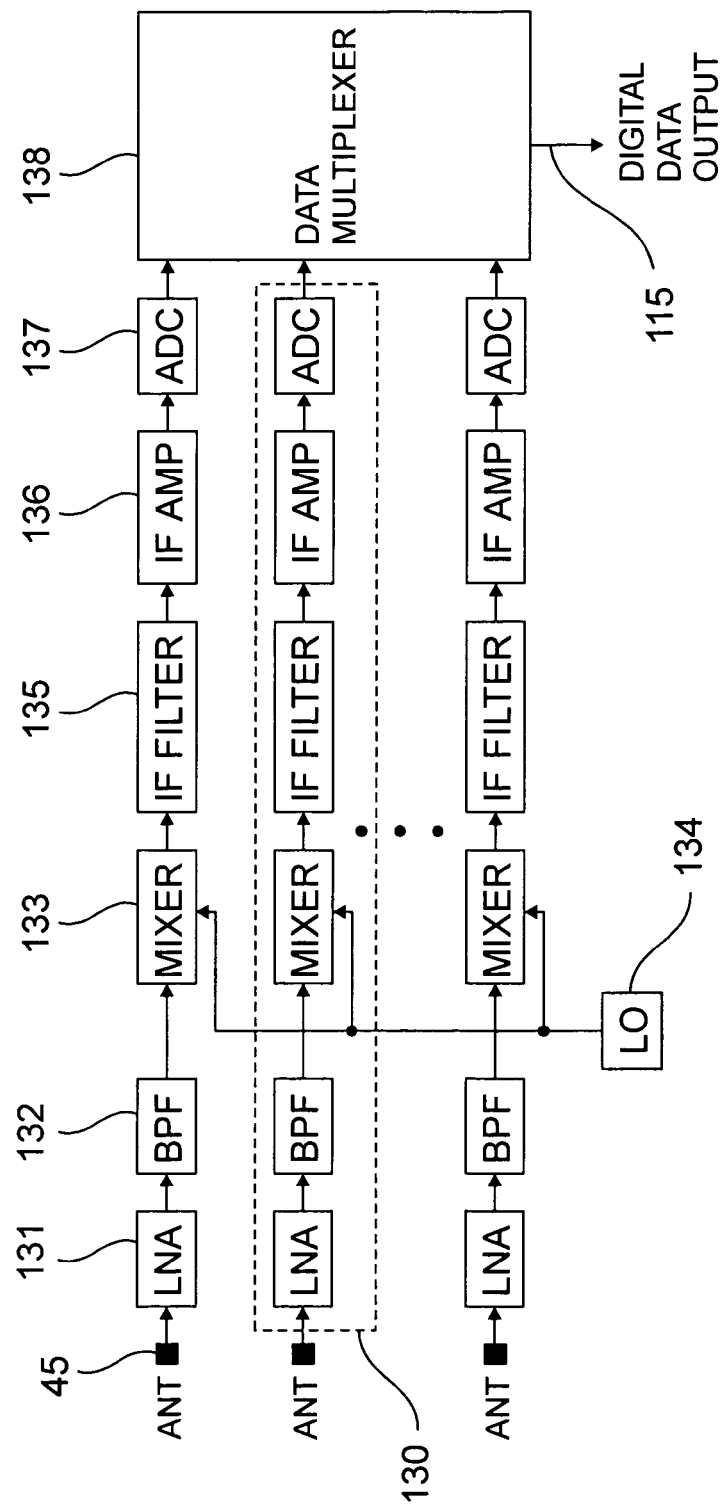
FIG. 6 illustrates a block diagram of the receivers attacked to each antenna element.

The signal produced by each antenna element 45 will be received using an identical antenna element 45 receiver 130 illustrated in FIG. 6 (same receiver as illustrated in FIG. 3 of patent application Ser. No. 12/661,595). That is, the signal from each antenna element 45 is amplified by low noise amplifier (LNA) 131, filtered using bandpass filter (BPF) 132, downconverted to intermediate frequency (IF) using mixer 133 and local oscillator (LO) 134, image and anti-alias filtered using IF filter 135, amplified and buffered using amplifier 136, and digitized using analog to digital converter (ADC) 137. The digitized signals of all receivers 130 on PCB 50 will be multiplex together using data multiplexer 138.

Antenna element 45 and LNA 131 can be designed as an active antenna to eliminate antenna to LNA connection loss. Doing so optimizes receiver noise figure and doesn't require a 50 ohm impedance match between the antenna and LNA. Data Multiplexer 138 places the data from all PCB 50 receivers 130 onto a single digital output 115. Coax or fiberoptic cable will be used to route digital output 115 to further circuitry in the 3D radar where the data from each receiver 130 will be demultiplexed, digitally beam formed, and processed as explained in patent application Ser. No. 12/661,595. Multiplexing the data from multiple antenna elements 45 eliminates the need for multiple cables and connectors, thus lowering implementation cost.

Figure 7:
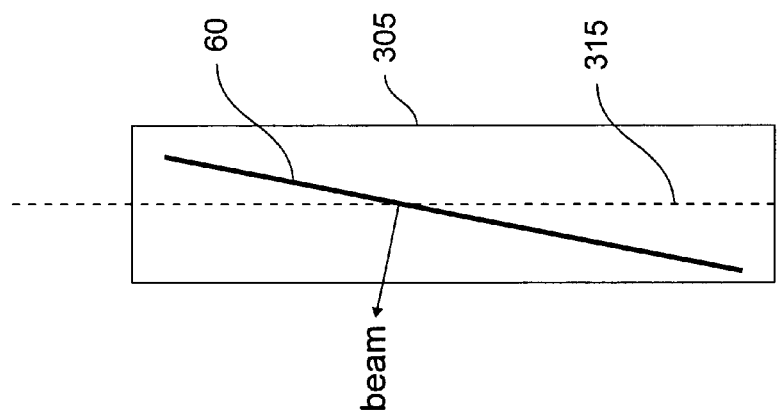
FIG. 7 illustrates the offset parabolic cylinder antenna tilted up 15 degrees, mounted on a rotating pedestal inside a radome, and mechanically rotated 360 degrees in azimuth.

Offset parabolic cylinder antenna 60 will be tilted up 15 degrees, mounted on a rotating pedestal, mechanically rotated 360 degrees in azimuth about rotation axis 315, and enclosed in radome enclosure 305 as illustrated in FIG. 7. Alternatively, radome enclosure 305 could be replaced by a non-radome enclosure in which only the area in front of offset parabolic cylinder antenna 60 is constructed of radome material. Instead of rotating the antenna inside the enclosure, the antenna is attached to the enclosure and the entire antenna and enclosure rotated about rotation axis 315.

Although the preferred embodiments of the invention have been illustrated and described in detail, it will be readily apparent to those skilled in the art that various modifications may be made therein without departing from the spirit of the invention.

For example, each PCB 50 could include all receiver, scaler, quadrature downconverter, and beamformers described in patent application Ser. No. 12/661,595. The beamformer outputs from each PCB 50 could then be combined in the signal detection processor, also described in patent application Ser. No. 12/661,595. Doing so would greatly reduce the data transfer requirements between the circuitry on PCBs 50 and the signal processor circuitry on another PCB.

As another example, modular vertical sections could be made short enough to contain a single antenna element and receiver. The number of modules stacked would determine the elevation beamwidth. Any convenient means such as coax, fiber optic, or wireless communications could be used to collect the data from all modules and transfer the digital data to the 3D radar for beamforming and further processing.

Also, this antenna could be used for many applications other than avian radar simply by changing the illumination pattern 25 of antenna element 45 and the aperture size of offset parabolic cylinder antenna 60.

Many other simple modifications are also possible without departing from the spirit of the invention.

What is claimed is:

1. A method of implementing a three dimensional ground based bistatic radar receiving antenna for detecting and precisely determining locations of birds in a surveillance volume, said method comprising:

providing a vertically oriented offset parabolic cylindrical antenna;

implementing said offset parabolic cylindrical antenna as receive only;

mounting an array of antenna elements along the vertical focal line of said offset parabolic cylindrical antenna;

receiving and converting signals from said antenna elements to digital data; and combining said digital data in a three dimensional ground based bistatic radar external to said three dimensional ground based bistatic radar receiving antenna to form multiple simultaneous receiving beams of any desired elevation beamwidths and sidelobes and electronically scanned in elevation by controlling the progressive phase difference and amplitude between said digital data from said array of antenna elements along said vertical focal line of said offset parabolic cylindrical antenna.

2. A method as claimed in claim 1 wherein said antenna elements illumination pattern is tapered to produce low azimuth sidelobe levels.

3. A method as claimed in claim 1 wherein said antenna elements vertical spacing is a half wavelength or less.

4. A method as claimed in claim 1 wherein said antenna elements are microwave patch antennas.

5. A method as claimed in claim 4 wherein said microwave patch antennas are grouped into sets and printed on a printed circuit board.

6. A method as claimed in claim 4 wherein said microwave patch antennas are horizontally polarized.

7. A method as claimed in claim 4 wherein said microwave patch antennas are active antennas.

8. A method as claimed in claim 1 wherein said offset parabolic cylindrical antenna is constructed by fastening the parabolic cylinder reflector surface to a series of vertically stacked thin ribs, said thin ribs machined or stamped in the shape of said parabolic cylinder reflector surface.

9. A method as claimed in claim 8 wherein narrower said offset parabolic cylindrical antenna azimuth beam-widths are implemented by increasing the width of said parabolic cylinder reflector surface.

10. A method as claimed in claim 1 wherein said offset parabolic cylindrical antenna is constructed as multiple short modular vertical sections stacked vertically to form the complete said offset parabolic cylindrical antenna.

11. A method as claimed in claim 10 wherein narrower said offset parabolic cylindrical antenna elevation beamwidths are implemented by stacking more said modular vertical sections.

12. A three dimensional ground based bistatic radar receiving antenna for detecting and precisely determining locations of birds in a surveillance volume, said antenna comprising:
a vertically oriented offset parabolic cylinder reflector surface;
an array of antenna elements mounted along the vertical focal line of said offset parabolic cylindrical reflector surface;
receivers coupled to said antenna elements, said receivers configured to receive, downconvert, and digitize signals from said antenna elements; and
data multiplexers coupled to said receivers and configured to send said antenna elements digital signal data to a three dimensional ground based bistatic radar external to said three dimensional ground based bistatic radar receiving antenna where said digital signal data is combined to form multiple simultaneous receiving beams of any desired elevation beamwidths and sidelobes and electronically scanned in elevation by controlling the progressive phase difference and amplitude between said digital signal data of said antenna elements.

13. A receiving antenna as in claim 12 wherein each said receivers additionally comprises:
a low noise amplifier coupled to said antenna elements and configured to amplify received signals from said antenna elements;
a bandpass filter coupled said low noise amplifier and configured to bandpass filter received signals from said antenna elements;
a mixer coupled to said bandpass filter and configured to downconvert received signals from said antenna elements;
an intermediate frequency filter coupled to said mixer and configured to anti-alias signals from said mixer;
an intermediate frequency amplifier coupled to said intermediate frequency filter and configured to amplify and buffer signals from said intermediate frequency amplifier; and
an analog to digital converter coupled to said intermediate frequency amplifier and configured to digitize signals from said intermediate frequency amplifier.

14. A receiving antenna as in claim 12 wherein said receiving antenna additionally comprises:
a plurality of thin ribs, said thin ribs machined or stamped in the shape of said offset parabolic cylinder reflector surface and positioned to support said offset parabolic cylinder reflector surface;
a plurality of thin rib supports connected to said thin ribs and configured to vertically separate and support said thin ribs;
a plurality of focal line supports connected to at least one thin rib support and configured to support and position said array of antenna elements along said vertical focal line; and
a plurality of printed wiring boards connected to one or more said focal line supports and configured to position said antenna elements along said focal line.

15. A receiving antenna as in claim 14 wherein said printed wiring boards additionally comprises a plurality of microwave patch antennas printed directly on said printed wiring boards, said microwave patch antennas configured as said array of antenna elements.

16. A receiving antenna as in claim 12 additionally comprising one or more data multiplexers connected to a plurality of said receivers and configured to multiplex digital signals from said plurality of said receivers onto a single digital data output.

17. A receiver antenna as in claim 12 additionally comprising a radome and rotating pedestal configured to mechanically rotate said receiver antenna 360 degrees in azimuth.

18. A method of implementing a three dimensional ground based bistatic radar receiver antenna, said method comprising:
providing a short vertical offset parabolic cylindrical reflector surface;
mounting an antenna element at the focal point of said short vertical offset parabolic cylindrical reflector surface;
receiving and converting said antenna element signal to digital data;
vertically stacking multiple said short vertical offset parabolic cylindrical reflector surface sections to form a tall offset parabolic cylindrical antenna; and
combining said digital data from said tall offset parabolic cylindrical antenna in a three dimensional ground based bistatic radar external to said three dimensional ground based bistatic radar receiver antenna to form multiple simultaneous receiving beams of any desired elevation beamwidths and sidelobes and electronically scanned in elevation by controlling the progressive phase difference and amplitude between said digital data from said tall offset parabolic cylindrical antenna.

19. A receiver antenna as in claim 18 additionally comprising a radome and rotating pedestal connected to said tall offset parabolic cylindrical antenna and configured to mechanically rotate said tall offset parabolic cylindrical antenna 360 degrees in azimuth.

* * * * *